No. 627,694.　　　　　　　　　　　　　　　　Patented June 27, 1899.
G. G. HOWE.
CHAIN.
(Application filed July 2, 1897.)
(No Model.)
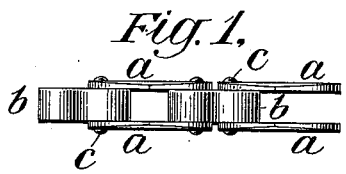
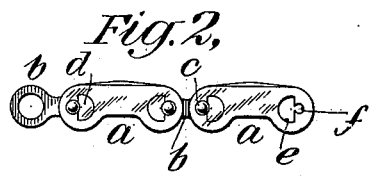
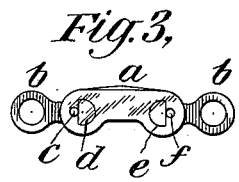
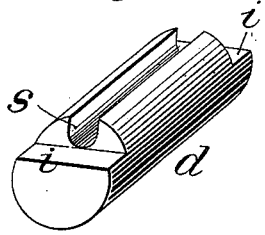
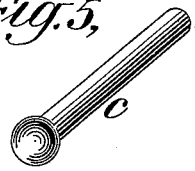
WITNESSES:　　　　　　　　　　　　　　　　INVENTOR
　　　　　　　　　　　　　　　　　　　　　Glenn G. Howe
　　　　　　　　　　　　　　　　　　　　　BY
　　　　　　　　　　　　　　　　　　　　　ATTORNEY
THE NORRIS PETERS CO., PHOTO-LITHO., WASHINGTON, D. C.

UNITED STATES PATENT OFFICE.

GLENN G. HOWE, OF INDIANAPOLIS, INDIANA, ASSIGNOR TO THE EWART MANUFACTURING COMPANY, OF CHICAGO, ILLINOIS.

CHAIN.

SPECIFICATION forming part of Letters Patent No. 627,694, dated June 27, 1899.

Application filed July 2, 1897. Serial No. 643,312. (No model.)

*To all whom it may concern:*

Be it known that I, GLENN G. HOWE, of Indianapolis, in the county of Marion and State of Indiana, have invented a new and useful Improvement in Chains; and I do hereby declare that the following is a full, clear, and exact description of the same, reference being had to the accompanying drawings, forming part of this specification.

My invention relates more particularly to that type of drive-chains in which the chain is made up of alternately-arranged centrally-open links (through the openings of which pass the teeth of a sprocket-wheel) and solid connecting-sections, and especially to that species of said type known as "bicycle-chain," in which the said alternately-arranged parts are usually designated, respectively, "wing-links" and "center blocks." As is well-known to those skilled in the art, chains of this species should possess great strength, combined with a maximum degree of lightness, must be very durable, must have the surfaces which are subjected to frictional wear extremely hard, must be comparatively simple of construction, and at the same time capable of easy repair in the event of breakage while in use by the cyclist on the road. I propose by the use of my invention to provide for use a chain which will possess in an eminent degree all these qualifications and which will in all practical respects be a most desirable article for all the purposes for which a chain of the species of chain to which my invention relates may be used; and to this main end and object my invention may be said to consist, essentially, of the construction and combination of parts which will be found hereinafter fully described and which will be most particularly pointed out in the claims of this specification.

To enable those skilled in the art to which my invention relates to make and use chain embodying it, I will now proceed to more fully explain my said improvement, referring by letters to the accompanying drawings, which form part of this specification and in which I have shown my invention carried into effect in the precise form of chain in which I have so far practically embodied it.

In the drawings, Figure 1 is a top view of my improved chain, drawn full size. Fig. 2 is a side or edge view of the same. Fig. 3 is a side view of one wing-link and two center blocks coupled together or assembled, but with the rivet-pin of one joint not yet upset or headed over and with the said pin of the other joint wholly omitted. Fig. 4 is a perspective view, on an enlarged or exaggerated scale, of one of the pivots detached. Fig. 5 is a similar view of one of the pins as it appears before having been used in the assembling together of the several parts of the chain in a permanent manner.

In the several figures the same part will be found always designated by the same letter of reference.

$a$ are the wing-links, each of which is composed, as seen, of two similar wings or of duplicate metallic plates that have punched in them, near their ends, irregularly-shaped holes for the reception of the ends of the pivots, and for the accommodation of the pins $c$ in a manner to be presently described, while $b$ are the center blocks, which are also, preferably, all alike and each of which, near each end, is perforated in about the usual manner for the accommodation of the pivots $d$, which pass through the said perforations. Each hole or perforation in each of the plates or wings of the links $a$ (see Fig. 1) is in contour a little more than semicircular, as at $e$, the cord of the incomplete circle having in it a nearly-U-shaped perforation $f$, supplemental to the main hole $e$, all as clearly illustrated, and so that when the chain parts are all put together, as seen at the right-hand side of the parts shown in Fig. 3, the approximately semicircular portions $e$ of the holes punched in each plate of the wing-link will be filled by the correspondingly-shaped end portions of the pivots $d$, and the rivet-pins $c$ will nearly or quite fill the portions $f$ of said holes.

Each pivot $d$ is made, as shown, (see particularly Fig. 4,) cylindrical throughout that portion of its length which lies between the inner faces of the plates composing a wing-link $a$ and which constitutes the pintle or male member of a hinge-joint between said wing-link and one of the center blocks $b$, except that a narrow spline or U-shaped groove $s$ is cut longitudinally in its periphery, as shown, and each pivot has a portion of its stock removed near each end to produce the nearly semicylindrical end portions $i$, (see Fig. 4,) that fit into and fill the correspondingly-shaped portion of the perforations in the plates of the links $a$.

The pivot-grooves $s$, it will be observed, are just deep enough to accommodate within them, as shown, the pins $c$, which latter when seated within said grooves lie wholly within the circumference of the body portion of the pivot, and the said pins are preferably cylindrical, or, in other words, each is composed of round wire headed at one end after the fashion of a pin and made so long that when assembled with a center block and wing-link one end will project or protrude far enough at one side of the latter to afford sufficient stock to be upset or riveted into a head about similar to that one formed on the pin in the process of manufacture of the latter.

In theory there is no reason why the pin $c$ might not be made to conform in cross-sectional shape to the U-shaped groove or channel in the pivot $s$ nor why the said groove might not be made nearly or quite circular in cross-sectional shape; but in practice it is better to have the pins $c$ of round wire, as shown, and to have the groove $s$ in each pivot made nearly or quite U-shaped, as I have shown it.

It is desirable, if not important, that the plates of the wing-links have the holes punched therein made just about as I have shown them—i. e., so that the cord (so to speak) of the main nearly semicylindrical portion $e$ of each hole be located about transversely to the draft-line of the chain and so that the portion $f$ of the aperture be located about coincident with the pitch-line of the chain, as then the remaining stock of the end portion of the wing-link $a$, as well as that of the semicircular end portion of the pivot, is disposed so as to afford the maximum degree of strength to these parts in the line of the draft strain, and the pins $c$ come as far away as possible circumferentially of the pivots from that part of the pivot's periphery which is subjected to frictional contact with the female member of the chain-joint.

Of course the center blocks are made of sufficiently hard metal to bear the frictional wear to which they are subjected both where they necessarily contact with the teeth of the sprocket-wheels over which the chain may be run and where their bores work in frictional contact with the pivots $d$, while the said pivots should of course be made exceedingly hard to withstand the frictional wear to which their peripheral surfaces are subjected. This may be done very readily, since the pivots may be hardened after having been put into their final shape.

In assembling the finished parts to form chain the upsetting or heading over of the pins at one end may be done in any usual or desirable manner.

It will be seen that in my improved chain the pivots $d$ are prevented from turning in the holes in the wing-link plates by reason of the non-circular (or irregular) shape in cross-section of the end portions of the pivots and the holes in said plates, while at the same time the transverse shoulders of the pivot end portions serve to properly hold apart the said plates, and that the draft strain on the chain exerts no tendency to spread said plates apart, since the adjacent surfaces of the pivot ends and the perforated plates are substantially transverse to the line of strain; also, that the pins $c$ perform solely the function of holding the parts together widthwise of the chain, and that as the construction of the latter is such that the draft strain exerts no tendency to separate the parts in this direction the comparatively small pins, of material soft enough to be easily riveted in place, perfectly serve the purpose for which alone the said pins are employed. Now in this connection it is to be remarked that should one of the pins happen to give out or get displaced by some accidental and unusual strain or shock to the chain the uncoupled parts can be replaced and very easily be temporarily held in a properly-assembled condition by the use of a large-sized ordinary pin (or piece of small wire) inserted within the groove of a pivot and through the holes of a wing-link and then bent over at one or both ends, and that thus in case of an emergency my improved chain when in use on a bicycle is very desirable on account of the facility with which it can be temporarily repaired so as to continue working.

What I claim as new, and desire to secure by Letters Patent, is—

1. In a chain of the type shown and described, the combination, with wing-links, the plates, or parts, of which have non-circular perforations in them; and center blocks, arranged as usual, between the said plates, of pivots, the end portions of which are of non-circular shape (in cross-section) and shouldered, to hold the said plates the proper distance apart, and the other portions of which constitute the male members of the chain-pivots; and rivet-like devices, which hold the said plates securely in place against the said pivot-shoulders; all substantially as and for the purposes hereinbefore set forth.

2. In a chain of the type shown and described, the combination of a wing-link, the plates of which have in them non-circular holes; a center block having in it a round hole; a pivot having irregularly-shaped end portions, which enter, but cannot turn within, the non-circular holes of the said plates, and that are shouldered for the said plates, to bear against, and have a middle, or main, body portion which serves as the pintle on which the said center block turns; and a fastening-pin, the middle portion of which is housed in a suitable longitudinal groove, or hole, in the body portion of the said pivot, and the end portions of which pass through the irregularly-shaped perforations of the said wing-link plates and are provided with heads which hold them in place endwise; all substantially as and for the purpose hereinbefore set forth.

In witness whereof I have hereunto set my hand this 3d day of June, 1897.

GLENN G. HOWE.

In presence of—
W. A. ROWLAND,
CHARLES PILZ.